July 12, 1949.  L. W. T. CUMMINGS  2,475,822
CATALYTIC REACTION APPARATUS
Filed Oct. 13, 1947  3 Sheets-Sheet 1
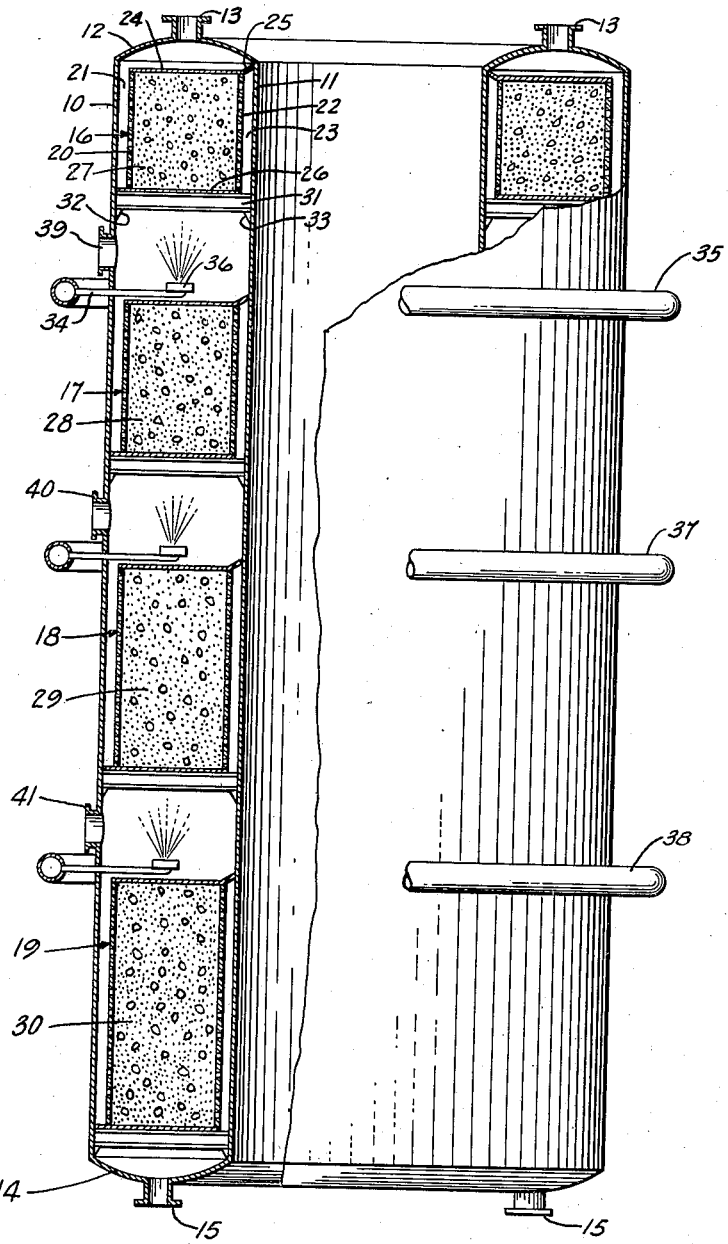
INVENTOR.
LELAND W. T. CUMMINGS
BY
Busser and Harding
ATTORNEYS July 12, 1949.　　　　L. W. T. CUMMINGS　　　　2,475,822
CATALYTIC REACTION APPARATUS
Filed Oct. 13, 1947　　　　　　　　　　　　　3 Sheets-Sheet 2
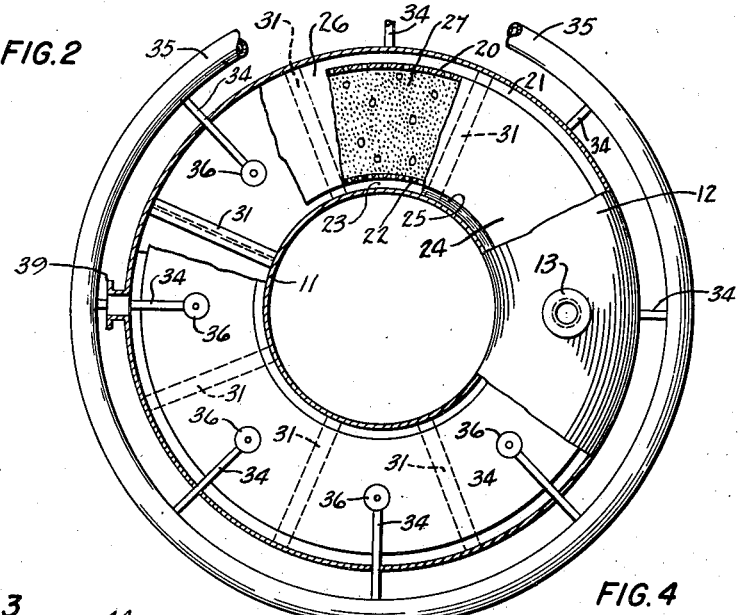
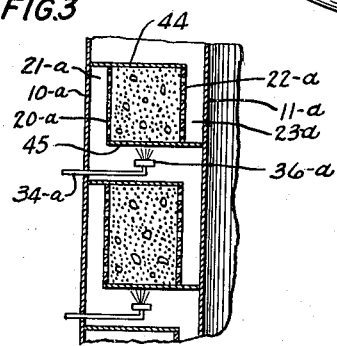
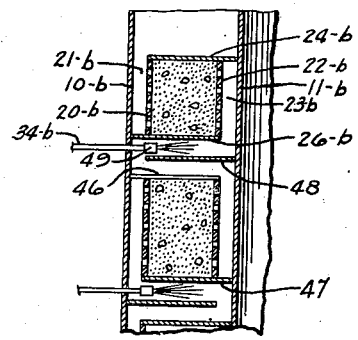
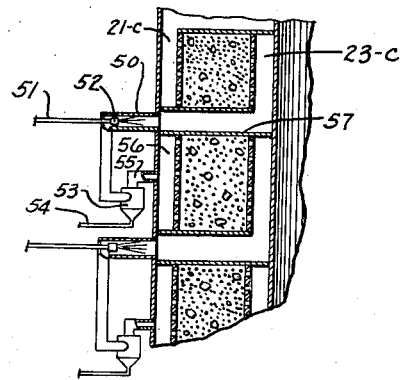
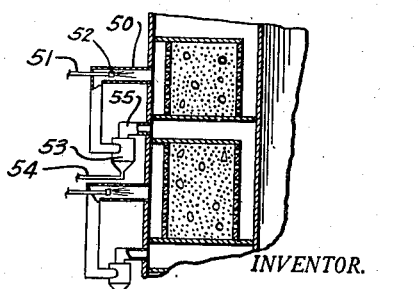
INVENTOR.
LELAND W. T. CUMMINGS
BY
Busser and Harding
ATTORNEYS July 12, 1949.  L. W. T. CUMMINGS  2,475,822
CATALYTIC REACTION APPARATUS
Filed Oct. 13, 1947  3 Sheets-Sheet 3
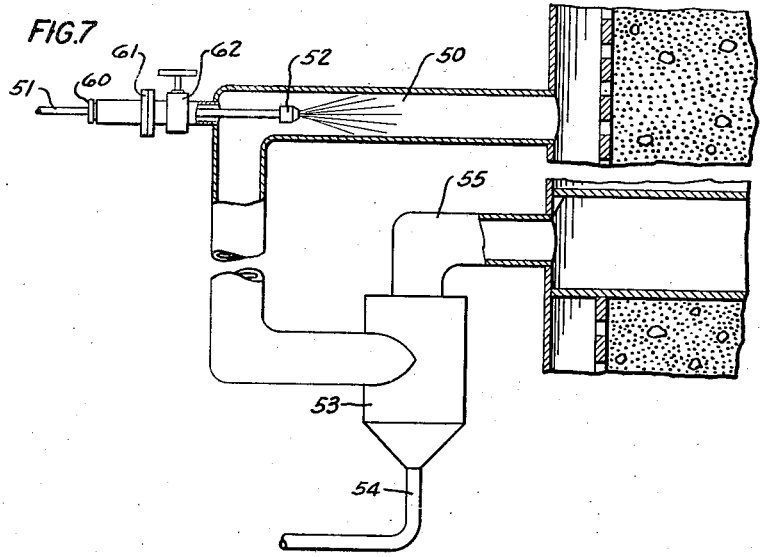
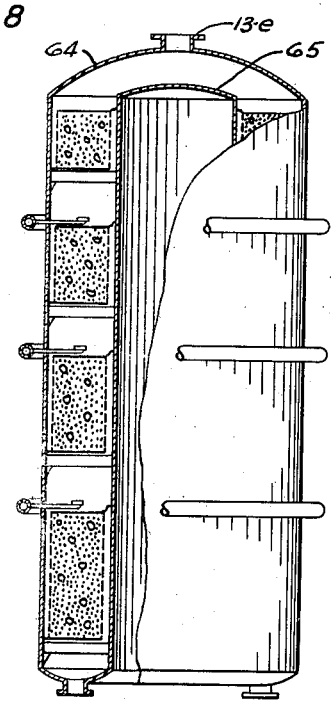
INVENTOR.
LELAND W. T. CUMMINGS
BY
ATTORNEYS Patented July 12, 1949

2,475,822

UNITED STATES PATENT OFFICE 2,475,822

CATALYTIC REACTION APPARATUS

Leland W. T. Cummings, Wyncote, Pa., assignor to Sun Oil Company, Philadelphia, Pa., a corporation of New Jersey Application October 13, 1947, Serial No. 779,558

7 Claims. (Cl. 23—288)

This invention relates to improved apparatus for conducting catalytic reactions and more particularly to apparatus for carrying out catalytic processes involving alternate endothermic and exothermic reactions. A typical process of this type is the catalytic conversion of hydrocarbons in a cyclic operation, wherein hydrocarbons are caused to react endothermically in the presence of a catalytic contact mass, causing deposition of carbonaceous deposits on the mass which reduce the catalytic activity, and the catalyst is then reactivated by burning off the carbonaceous material. The catalytic cracking of higher boiling hydrocarbons to lower boiling hydrocarbons is a specific example of this type of process. Other examples are reforming, dehydrogenation and the like.

More specifically, the present invention is concerned with an improved catalytic reactor for use in a stationary bed type of operation, wherein the catalyst is employed in the form of a plurality of stationary beds within the reactor and is regenerated periodically in situ by passing hot oxygen-containing gases through the several beds. The reactor is especially adapted for use in that type of catalytic conversion generally referred to in the art as adiabatic operation. By this is meant that both the endothermic and exothermic reactions are carried out without the use of a circulating convective fluid for supplying heat to, or removing heat from, the reaction zone by indirect heat transfer. In other words, in such adiabatic operation the heat required for the endothermic reaction is supplied either as sensible heat of the reactants entering the reaction zone or as heat stored in the contact mass during the previous regeneration period, while the heat evolved during the exothermic reaction either is stored in the contact mass for use in the subsequent on-stream period or else is removed from the reaction zone in the form of sensible heat of the effluent regeneration gases. The reaction apparatus according to the present invention is especially adapted for storage within the contact mass of a large proportion of the exothermic heat evolved during the regeneration period for use during the subsequent on-stream period. A feature of the invention permits the utilization of this stored heat not only as heat of reaction but also as heat for evaporating hydrocarbon charge material introduced between the several beds of catalytic contact mass.

The features and advantages of the invention can best be understood by reference to the accompanying drawings, in which:

Figure 1 is an elevational view, partly in section, of one form of the improved catalytic reactor;

Figure 2 is a top view of the reactor of Figure 1 with sections broken away at several levels to show internal details;

Figure 3 is a sectional view of a portion of the reactor showing a modified catalyst tray arrangement;

Figure 4 is a sectional view of a portion of the reactor showing another modification in tray arrangement;

Figure 5 is a partly sectional view showing another modification in tray arrangement and also showing external means for introducing additional reactants;

Figure 6 is a partly sectional view similar to Figure 5 but representing another modification;

Figure 7 is an enlarged view, partly in section, of the external means for introducing additional reactants; and Figure 8 is a partly sectioned elevational view of a modified form of the reactor.

It will be understood that the drawings are merely illustrative of certain embodiments and that numerous specific modifications may be made without departing from the scope of the invention.

Referring to the drawings, Figures 1 and 2 show one form of the improved catalytic reaction apparatus wherein the body of the reactor comprises a vertically elongated cylindrical outer shell 10 and a vertically elongated cylindrical inner shell 11 concentrically disposed therein to form an annular space between the shells. Manifold means are provided at both the top and bottom of the reactor for introducing reactants into the annular space at the top and withdrawing reaction products from the annular space at the bottom. As shown in the drawings, such manifold means may comprise a top cover member 12 integrally connected to the inner and outer shells and having one or more inlet connections or nozzles 13 for introduction of reactants, and a bottom member 14 having one or more outlet connections or nozzles 15 for withdrawing the reaction products.

Located within the annular space between the inner and outer shells are a plurality of superposed trays, shown generally as 16, 17, 18 and 19, which are positioned in spaced apart relation to each other and are each adapted to retain therein a bed of granular contact material indicated by numerals 27, 28, 29 and 30. While for purpose of illustration four such trays or beds are shown, it will be understood that any suitable or desired number may be provided. Since all the trays may be of similar construction, the following description thereof is made with specific reference only to the top tray. Each tray may comprise an outer wall 20 which is continually perforated to permit flow of fluid therethrough and which has a diameter less than that of the outer shell 10 so as to provide an annular space 21 at the outer side of each tray, and an inner wall 22 which is likewise perforated and which has a diameter greater than that of the inner shell 11 so as to provide an annular space 23 at the inner side of the tray. An imperforate top member 24 covers the top of each tray and carries on the side adjacent the inner shell 11 a shoulder portion 25 which extends inwardly to the inner shell, thereby closing off the top of annular space 23. The shoulder portion 25 preferably should include an expansion joint (not shown) to provide for expansion or contraction resulting from temperature changes during use of the apparatus.

Each tray also comprises an imperforate bottom plate member 26 which extends laterally from inner wall 22 to outer shell 10, thereby functioning as a bottom for the tray and also serving to close the outer annular space 21 at its bottom. The trays may be supported within the apparatus by means of a plurality of beams 31 extending radially from the outer shell 10 to the inner shell 11 and resting upon support means 32 and 33 secured to the outer and inner shells, respectively, in any suitable manner. The simplicity of construction of the support means for the catalyst trays is a particularly advantageous feature of the present reactor.

The trays are filled with a granular contact material, illustrated in the drawings by numerals 27, 28, 29 and 30, which preferably is a mixture of catalyst (for example, a silica-alumina type catalyst if the reaction to be conducted is the cracking of hydrocarbons) and a granular inert material of high heat absorbing capacity (for example, artificially fused oxide such as described in Houdry Patent No. 2,414,812). The proportion of catalyst to heat absorbing material may vary widely depending upon the particular materials used and the amount of heat that it is desired to store in the contact mass during each cycle, but generally will be within the range of 1:5 to 3:1. With the tray construction as shown in Figure 1 and with the general direction of reactant flow from top to bottom of the reactor, it will be apparent that the flow of reactants through each bed will be in a generally horizontal direction inwardly. Thus, reactants will enter each bed from the outer annular space 21 through the perforations in outer wall 20 and will leave each bed by issuing through the perforations in inner wall 22 into the inner annular space 23, thence flowing to the next lower bed and passing therethrough in like manner.

It is distinctly preferable that each of the walls, 20 and 22, be so designed with respect to the number and size of perforations that the pressure drop across each wall during regeneration will be within the range of 0.2 to 1.0 lb./sq. in. and preferably of the order of 0.5 lb./sq. in. This will insure good distribution of regenerating gas flowing through the contact mass and will minimize by-passing in case of shrinkage of the contact mass within the tray. Such shrinkage has been found to occur almost invariably upon prolonged operation, and consequently it is of great importance that the inner and outer walls of the trays be properly orificed to give the desired pressure drop as above specified for the regeneration period. This will also insure satisfactory distribution of reactants during the on-stream period.

In the space between adjacent beds of catalytic contact material, means are provided for introducing additional amounts of reactants in the form of a fine spray into the vapor stream passing from one bed to the next lower bed. Figures 1 and 2 show such means for introducing liquid reactants, for example, between the uppermost tray 16 and the next lower tray 17 as a plurality of inlet lines 34 leading from a circular manifold line 35 into the reactor and each having a liquid spray nozzle 36 preferably pointing upwardly. Similar arrangements are provided for introducing liquid reactants from feed lines 37 and 38 into the spaces between the other trays It will be noted that the catalyst beds 16, 17, 18 and 19 are of varying height, increasing in the direction from top to bottom of the reactor. This is distinctly preferable in order to compensate for the additional reactants introduced as spray between the beds so that the space velocities of reactants passing through the several catalyst beds will be about the same. In operation, during the on-stream or endothermic reaction period, hydrocarbon reactants are introduced into the top of the reactor through inlets 13 and pass into the outer annular space 21 and inwardly through the uppermost catalyst bed 16 and into the inner annular space 23. In passing through bed 16 the reactants will absorb heat from the contact material 27 in excess of that necessary for the endothermic conversion reaction and accordingly the hydrocarbons flowing into inner annular space 23 will be at a higher temperature than the reactants entering bed 16. The temperature will also be higher at this point than desired for reaction in the next lower catalytic bed 17. This excess heat in the reactants from bed 16 is utilized to vaporize the liquid reactants injected through lines 34 and spray nozzles 36 so that the temperature of the mixture passing to bed 17 will be at the desired value. The resulting vapor mixture then passes through bed 17 where heat is again picked up in excess of that necessary for maintaining the catalytic conversion reaction, and after passing through the bed the vapors commingle with the next liquid spray introduced through the spray nozzles positioned between beds 17 and 18. Liquid reactants are injected at this point again in sufficient amount to reduce the temperature of the mixture passing to bed 18 to the desired value. The mixture then flows through bed 18 where absorption of heat is again in excess of that necessary for the reaction, and the resulting reactants are again cooled after leaving bed 18 by admixture with a third liquid spray introduced through the lowermost set of spray nozzles before passing to catalytic bed 19, etc.

By way of example, in the catalytic cracking of hydrocarbons the reactants flowing to bed 16 may have a temperature of say 800–900° F.; whereas the hydrocarbons issuing from bed 16 into inner annular space 23 may have a temperature of 1000–1100° F. Sufficient liquid reactants, at a temperature of say 200–600° F., may be introduced as quenching material through spray nozzles 36 to cause the resulting vapor mixture passing to bed 17 to have a temperature of 800–900°

F. Upon passing through bed 17, the mixture will absorb sufficient heat to reach a temperature again of 1000–1100° F. Similar fluctuations in temperature will occur as the reactants pass downwardly through the reactor and alternately come in contact with the spray streams and the other catalytic contact masses.

Regeneration of the contact mass is effected by blowing an oxygen-containing gas such as air through the beds. This may be done by passing the regenerated gas through the several beds in series. This method of regeneration, however, may entail certain disadvantages. A possible disadvantage is that upon completing the regeneration in this manner the beds may be left at different temperatures, the first bed tending to have a temperature about the same as that of the entering regeneration gas whereas the last bed may be at a considerably higher temperature. When this condition occurs, there will be a tendency during the subsequent on-stream operation to deposit a greater amount of carbonaceous material in the bed or beds having the higher temperature. Then, upon further regeneration, the temperature of these beds may become even higher than during the previous regeneration. Thus, it is possible that regeneration in series may result in overheating of certain beds. A still further disadvantage of this type of regeneration is that it necessitates a high pressure drop through the reactor.

In order to permit the regeneration to be carried out in improved manner, the reactor is provided with side inlet or outlet means between the beds, illustrated in Figure 1 as flanged nozzles 39, 40 and 41. Nozzles 39 and 41 serve as inlets for the regenerating gas while nozzle 40 and nozzles 13 and 15 serve as outlets for the combustion gases. During regeneration, regenerating gas enters through inlet nozzle 39 into the space between beds 16 and 17 and thence flows in two directions. One portion flows through bed 16 and out of the reactor at the top through nozzles 13. The rest of the regenerating gas passes downwardly through bed 17 and out of the reactor through nozzle 40. In view of the construction of the beds, the flow of regenerating gas therethrough is automatically maintained at the same space velocities and no additional means is needed for regulating the relative rates of flow to the individual beds. Regenerating gas is likewise introduced through nozzle 41 into the space between beds 18 and 19, whence part of it flows through bed 18 and out of the reactor through nozzle 40 while the rest passes downwardly through bed 19 and out through nozzles 15. By operating in this manner, each bed is regenerated by a separate stream of the regenerating gas, with the result that the temperature of the beds at the end of the regeneration period is more nearly uniform and the pressure drop through the reactor during regeneration is greatly reduced.

Figure 3 illustrates a modified form of catalyst tray arrangement in which the reactants flow across each bed in an outward direction rather than inwardly as in Figure 1. In this modification each tray has an imperforate top member 44 which extends from the inner perforate wall 22—a to the outer shell 10—a so as to close the outer annular space 21—a at its top, and an imperforate bottom member 45 which extends from the outer perforate wall 20—a inwardly to the inner shell 11—a. Liquid reactants are introduced between the beds by means of inlet line 34—a and spray nozzle 36—a.

Figure 4 shows another tray arrangement wherein the reactants flow through adjacent beds in opposite directions. This has the advantage of minimizing differential expansion of the inner and outer shells, since it eliminates the condition whereby one or the other of the shells is exposed exclusively to the hot effluent products from the beds before the same are quenched. As shown in Figure 4, the trays alternate in construction between that of Figure 1 and that of Figure 3. Thus, the upper tray may have an imperforate top member 24—b which extends from outer perforate wall 20—b to inner shell 11—b to close off the inner annular space 23—b at its top, and an imperforate bottom member 26—b extending from inner perforate wall 22—b to the outer shell 10—b to close off the bottom of outer annular space 21—b. Through this bed, the flow of reactants will be inwardly. The next lower tray will have an imperforate top member 46 which extends outwardly to the outer shell 10—b and an imperforate bottom member 47 extending inwardly to the inner shell 11—b. The flow through this bed will thus be in an outward direction. A baffle 48 is positioned horizontally between the beds to prevent the reactants from flowing directly from one bed to the next, and spray means comprising inlet line 34—b and horizontal spray nozzle 49 are provided for injecting liquid spray into the vapor stream passing around the baffle.

Figures 5 and 6 are directed to modifications in which the spray means are located outside of the outer shell of the reactor and in which separating means are provided for removing any liquid which has not vaporized from the vaporous reactants before the latter are introduced into the reactor and pass to the next catalyst bed. One advantage of these modifications is that the reactor is not subjected to differential temperature effects resulting from contact of the relatively colder liquid spray with portions of the reactor. In Figure 5 the uppermost tray has the same construction as the top tray of Figure 1. Reactants from the top of the reactor flow into outer annular space 21—c and through the bed into inner annular space 23—c. From there, the vapors flow beneath the bed and through the outer shell into conduit 50. Conduit 50 serves also as a spray chamber, the liquid being introduced therein through line 51 and spray nozzle 52 positioned within the conduit. The mixture of reactants flow to a tangential type separator 53 wherein they are introduced essentially tangentially to cause any liquid which is too high boiling to vaporize under the prevailing temperature and pressure conditions to separate from the vapors. Such liquid may be withdrawn from the separator through line 54. The liquid-free vapor then passes through conduit 55 into the outer annular space 56 adjacent the next catalyst bed. Similar externally positioned conduit, spray and separating means are provided for the reactants flowing between the other beds. In order to properly direct the flow, each tray except the top one has an imperforate top member, such as shown at 57, which extends across the entire annular space between the inner and outer shells thereby requiring that the reactants flow through the conduit means outside of the reactor. It is evident that the tangential separator 53 may be omitted in cases where the liquid reactants sprayed into conduit 50 are substantially completely vaporizable under the prevailing temperature and pressure conditions.

Figure 6 shows an arrangement similar to Figure 5 except that the flow across each bed is in an outward direction. This is effected, as shown in Figure 6, by having the top imperforate member for each tray extend from the inner perforate wall of the tray to the outer shell, while the bottom imperforate member extends entirely across the annular space between the inner and outer shells, except in the case of the lowermost tray (not shown). The conduit, spray and separating means of Figure 6 may be identical with that of Figure 5, and are shown in more detail in Figure 7. Means are included in Figure 7 for permitting the spray nozzle 52 to be removed and cleaned or a new nozzle substituted while the reactor is in operation. This may comprise a relatively short section of piping connecting with conduit 50 and having an internal diameter sufficiently large that spray nozzle 52 on inlet 51 may pass therethrough. The piping includes a bushing 60 through which line 51 is slidable, a flanged portion 61 and gate valve 62. Whenever it is desired to inspect spray nozzle 52 or remove it from conduit 50 for any reason, line 51 is drawn to the left through bushing 60 until spray nozzle 52 has passed through valve 62. The latter is then closed and the piping is opened at flange 61, thereby permitting access to the spray nozzle.

The reactor shown in Figure 8 is similar to that of Figure 1 except that the manifold means providing a fluid inlet to the annular space between the inner and outer shells of the reactor at the top is different. In this modification the outer shell includes a convex top portion 64 carrying inlet nozzle 13—e, and the inner shell likewise includes a convex top portion 65 which is completely enclosed by the outer shell to provide a space for flow of reactants therebetween. Suitable means for supporting the inner shell in its position within the outer shell should be provided to offset the pressure on the top portion 65. The catalyst beds and spray means may be arranged according to any of the forms above described.

It will be understood that in the above description various details of construction representing good engineering practice have been omitted, since they will be readily apparent to one skilled in the art. For instance, it is apparent that suitable manholes should be provided for access to the inside of the reactor and that means should be provided for filling and emptying the trays with contact materials. Likewise, suitable insulating means should be included.

Having described my invention, what I claim and desire to protect by Letters Patent is:

1. Catalytic reaction apparatus for conducting alternate endothermic and exothermic reactions which comprises a vertically elongated outer shell, a vertically elongated inner shell disposed centrally within said outer shell to form an annular space therebetween, manifold means at the top of said annular space providing a fluid inlet for introduction of reactants, manifold means at the bottom of said annular space providing a fluid outlet for removal of reaction products, a plurality of annular shaped trays superposed within said annular space in spaced-apart relation to each other and adapted each to retain a bed of granular contact material, each of said trays comprising an outer perforate wall of lesser diameter than said outer shell so as to provide an annular space at the outer side of the tray and an inner perforate wall of greater diameter than said inner shell so as to provide an annular space at the inner side of the tray, an imperforate top member and an imperforate bottom member for each of said trays, means for directing the flow of reactants so as to cause the reactants to enter each bed from one of the side annular spaces and to flow therethrough in a generally horizontal direction to the other side annular space and thence to the inlet side annular space adjacent the next lower tray and spray means positioned in the path of flow between trays for introduction of liquid reactants into the flowing stream in the form of a fine spray.

2. Apparatus according to claim 1 wherein said means for directing the flow of reactants includes a spray chamber located outside said outer shell and within which said spray means is positioned, conduit means for passing reactants from said other side annular space to the spray chamber and other conduit means for passing reactants from the spray chamber to said inlet side annular space adjacent the next lower tray.

3. Apparatus according to claim 1 wherein said means for directing the flow of reactants includes a spray chamber located outside said outer shell and within which said spray means is positioned, conduit means for passing reactants from said other side annular space to the spray chamber, a tangential type separator having a vapor outlet at the top and a liquid outlet at the bottom, conduit means for passing reactants from said spray chamber to said separator and introducing the same therein tangentially at a locus between said vapor outlet and said liquid outlet, and conduit means for passing the vapor from said separator to said inlet side annular space adjacent the next lower tray.

4. Catalytic reaction apparatus for conducting alternate endothermic and exothermic reactions which comprises a vertically elongated outer shell, a vertically elongated inner shell disposed centrally within said outer shell to form an annular space therebetween, manifold means at the top of said annular space providing a fluid inlet for introduction of reactants, manifold means at the bottom of said annular space providing a fluid outlet for removal of reaction products, a plurality of annular shaped trays superposed within said annular space in spaced-apart relation to each other and adapted each to retain a bed of granular contact material, each of said trays comprising an outer perforate wall of lesser diameter than said outer shell so as to provide an annular space at the outer side of the tray and an inner perforate wall of greater diameter than said inner shell so as to provide an annular space at the inner side of the tray, an imperforate top member and an imperforate bottom member for each of said trays, one of said imperforate members extending inwardly to said inner shell and the other of said imperforate members extending laterally to said outer shell so as to cause the reactants to enter each bed from one of the side annular spaces and flow therethrough in a generally horizontal direction to the other side annular space, means defining a flow passageway from the outlet side annular space adjacent each tray to the inlet side annular space adjacent the next lower tray, and spray means positioned in each of said passageways for introduction of liquid reactants into the flowing stream in the form of a fine spray.

5. Apparatus according to claim 4 wherein said means defining a flow passageway includes a spray chamber located outside said outer shell and within which said spray means is positioned, conduit means for passing reactants from said last-named side annular space to the spray chamber and other conduit means for passing reactants from the spray chamber to said inlet side annular space adjacent the next lower tray.

6. Apparatus according to claim 4 wherein said means defining a flow passageway includes a spray chamber located outside said outer shell and within which said spray means is positioned, conduit means for passing reactants from said last-named side annular space to the spray chamber, a tangential type separator having a vapor outlet at the top and a liquid outlet at the bottom, conduit means for passing reactants from said spray chamber to said separator and introducing the same therein tangentially at a locus between said vapor outlet and said liquid outlet, and conduit means for passing the vapor from said separator to said inlet side annular space adjacent the next lower tray.

7. In combination with a catalytic conversion apparatus adapted for conducting alternate endothermic and exothermic reactions and comprising an outer shell and means within said outer shell for maintaining a series of spaced-apart beds of catalytic contact material; a spray chamber located outside of said outer shell for each pair of adjacent beds of catalytic contact material, spray means positioned within each of said chambers for introducing liquid reactants therein in the form of a fine spray, manifold means for directing the stream of vapors passing from each bed without said outer shell and to the corresponding spray chamber, a tangential type separator in association with each spray chamber and having a vapor outlet at the top and a liquid outlet at the bottom, conduit means for passing the reactants from each of said spray chambers to the corresponding separator and introducing the same therein tangentially at a locus between said vapor outlet and said liquid outlet, and manifold means for directing the stream of vapors from said vapor outlet of the separator to the next bed of catalytic contact material.

LELAND W. T. CUMMINGS.

No references cited